United States Patent [19]
Davis, II

[11] Patent Number: 5,424,875
[45] Date of Patent: Jun. 13, 1995

[54] MOTOR VEHICLE SAFETY MIRROR

[76] Inventor: Floyd E. Davis, II, 2206 Dartmouth, Arlington, Tex. 76015

[21] Appl. No.: 181,809

[22] Filed: Jan. 18, 1994

[51] Int. Cl.⁶ .......................... G02B 5/08; G02B 7/18; B60R 1/06
[52] U.S. Cl. .................................. 359/850; 359/855; 359/872; 359/881
[58] Field of Search .............. 359/850, 855, 856, 857, 359/862, 864, 865, 872, 875, 881

[56] References Cited

U.S. PATENT DOCUMENTS

| | | | |
|---|---|---|---|
| T951,004 | 10/1976 | Devlin, Jr. | |
| 1,338,738 | 5/1920 | Kometter, Jr. | 359/862 |
| 1,426,010 | 8/1922 | Rees | 359/855 |
| 1,562,335 | 11/1925 | Jones | 359/855 |
| 1,837,085 | 12/1931 | Van Gelder | 359/855 |
| 1,986,033 | 1/1935 | Trufant . | |
| 2,320,904 | 6/1943 | Bachkai | 359/862 |
| 2,483,202 | 9/1949 | Jackson | 359/549 |
| 3,187,628 | 6/1965 | Canns et al. | 359/866 |
| 3,252,377 | 5/1966 | Kentes | 359/855 |
| 3,610,739 | 10/1971 | Seashore . | |
| 3,659,927 | 5/1972 | Moultrie . | |

FOREIGN PATENT DOCUMENTS

| | | | |
|---|---|---|---|
| 1803363 | 6/1970 | Germany | 359/855 |
| 2600223 | 7/1977 | Germany | 359/866 |
| 0597369 | 8/1959 | Italy | 359/850 |
| 0193463 | 2/1923 | United Kingdom | 359/855 |
| 1070598 | 6/1967 | United Kingdom | 359/855 |

*Primary Examiner*—Ricky D. Shafer
*Attorney, Agent, or Firm*—Robert A. Shack; David L. Baker; Rhodes & Ascolillo

[57] ABSTRACT

A mirror arrangement for mounting on a motor vehicle, the motor vehicle having a passenger compartment, the mirror arrangement including a polygonal three dimensional member having at least two planar surfaces oriented obliquely with respect to one another and intersecting one another at an apex, at least two mirrored surfaces, one each of the at least two mirrored surfaces being disposed on one each of the at least two planar surfaces, the apex being oriented substantially toward the passenger compartment of the motor vehicle, the angle of the apex being substantially between about 60 degrees and 120 degrees, an adjustment mechanism for rotating the directional orientation of the apex, the adjustment mechanism including: a rotatable support shaft connected to the polygonal three dimensional member, and a coaxial cable connected to the rotatable support shaft, the coaxial cable extending into the passenger compartment of the motor vehicle, and a mounting mechanism for mounting the mirror arrangement on at least one of a forward portion and a rearward portion of the motor vehicle.

2 Claims, 5 Drawing Sheets

MOTOR VEHICLE SAFETY MIRROR

BACKGROUND

1. Field of the Invention

The present invention relates to the field of mirrors for motor vehicles, for example, mirrors that alert the motorist to traffic that is approaching from various angles, e.g., from a side street.

2. Description of the Related Art

U.S. Pat. No. 3,659,927 relates to a so-called "dove" prism particularly adapted for the optical trains of rear view vision devices, the dove prism being in the form of an isosceles triangular prism filled with an optical liquid.

U.S. Pat. No. 3,610,739 relates to a rear vision mirror system for vehicles that includes an interior plane mirror and a fender mirror mounted on each of the forward fenders of the vehicle, the fender mounted mirrors being convex and having a preselected radius of curvature.

U.S. Pat. No. 1,986,033 relates to a rear vision reflector for automobiles wherein a supplemental reflector is mounted on a vertically inclined angle above the rear window of an automobile, the supplemental reflector being viewable in the main mirror mounted over the windshield and thereby providing the driver with a view of the ground area, including any curbs, etc., immediately behind the automobile.

U.S. Defensive Publication No. T951,004 relates to a rear view mirror system that includes a plane mirror mounted interiorly of a vehicle and a convex mirror mounted exteriorly of the vehicle.

SUMMARY OF THE INVENTION

The operators of motor vehicles must frequently enter a busy road from a side street, alley, or driveway where their vision is obscured and they cannot see oncoming pedestrians or traffic. Various convex mirror arrangements have been proposed and used for providing the motor vehicle operator with an improved field of vision. However, such arrangements are usually aimed at providing the motorist with an improved backward looking view, and do not address the problem of other vehicles or pedestrians entering from a side street. Moreover, convex mirrors usually present the motorist with a lesser quality image and, additionally, fail to convey depth perception adequately.

Accordingly, the present invention is directed toward providing an apparatus that can reduce the danger associated with situations wherein a vehicle or pedestrian is entering the motorist's pathway from an oblique angle.

One object of the present invention is the provision of a mirror arrangement that provides a motorist with improved vision to either or both the right and left directions of his or her path of travel.

Another object of the invention is the provision of such a mirror arrangement that is adjustable by the motorist to suit his or her individual needs.

A further object of the invention is the provision of such an mirror arrangement that is simple in operation and construction and, therefore, inexpensive to manufacture.

In one aspect, the invention generally features a mirror arrangement for mounting on a motor vehicle, the motor vehicle having a passenger compartment, the mirror arrangement including: at least two mirrored surfaces; the at least two mirrored surfaces lying on intersecting planes; the intersecting planes forming an apex; and the apex being oriented substantially toward the passenger compartment of the motor vehicle.

Preferably, the angle of the apex is substantially between about 60 degrees and 120 degrees; the mirror arrangement additionally includes an adjustment mechanism for rotating the directional orientation of the apex; the mirror arrangement additionally includes a height adjustment mechanism for varying the vertical height of the at least two mirrored surfaces with respect to the passenger compartment of the motor vehicle; the adjustment mechanism includes a rotatable support shaft connected to the at least two mirrored surfaces, and a mechanism for rotating the rotatable shaft; the mirror arrangement additionally includes a first mounting mechanism for mounting the mirror arrangement on a forward portion of the motor vehicle; the first mounting mechanism includes a mechanism for mounting the mirror arrangement on a forward bumper of the motor vehicle; the mirror arrangement additionally includes a second mounting mechanism for mounting the mirror arrangement on a rearward portion of the motor vehicle; the second mounting mechanism includes a mechanism for mounting the mirror arrangement on a rearward bumper of the vehicle; the adjustment mechanism additionally includes a coaxial cable connected to the rotatable support shaft, the coaxial cable extending into the passenger compartment of the motor vehicle; the angle of the apex is substantially equal to about 90 degrees; and the angle of the apex is substantially equal to about 120 degrees.

In another aspect, the invention generally features a mirror arrangement for mounting on a motor vehicle, the motor vehicle having a passenger compartment, the mirror arrangement including: a polygonal three dimensional member having at least two planar surfaces oriented obliquely with respect to one another and intersecting one another at an apex; at least two mirrored surfaces; one each of the at least two mirrored surfaces being disposed on one each of the at least two planar surfaces; the apex being oriented substantially toward the passenger compartment of the motor vehicle; the angle of the apex being substantially between about 60 degrees and 120 degrees; an adjustment mechanism for rotating the directional orientation of the apex, the adjustment mechanism including: a rotatable support shaft connected to the polygonal three dimensional member; and a coaxial cable connected to the rotatable support shaft, the coaxial cable extending into the passenger compartment of the motor vehicle; and a mounting mechanism for mounting the mirror arrangement on at least one of a forward portion and a rearward portion of the motor vehicle.

In yet another aspect, the invention generally features a mirror arrangement for mounting on a motor vehicle, the motor vehicle having a passenger compartment, the mirror arrangement including: a polygonal three dimensional member; the polygonal three dimensional member having a pair of substantially converging side faces; the substantially converging side faces of the polygonal three dimensional member converging at an apex; the apex being oriented substantially toward the passenger compartment of the motor vehicle; and a plurality of facet surfaces formed in each of the substantially converging side faces; each of the plurality of facet surfaces being substantially reflective; the plurality of facet surfaces being provided in pairs, one each of the pairs of facet surfaces being disposed on one each of the substantially converging side faces; and each of the pairs of facet surfaces having a unique and distinct angular inclination with respect to a line bisecting the apex.

Preferably, the mirror arrangement includes three pairs of facet surfaces, each of a first pair of the three pairs of facet surfaces having a substantially 30 degree angular inclination with respect to the line bisecting the apex, each of a second pair of the three pairs of facet surfaces having a substantially 45 degree angular inclination with respect to the line bisecting the apex, and each of a third pair of the three pairs of facet surfaces having a substantially 60 degree angular inclination with respect to the line bisecting the apex, The invention will now be described by way of a particularly preferred embodiment, reference being made to the accompanying drawings, wherein:

DESCRIPTION OF THE PREFERRED EMBODIMENT

Figure 1:
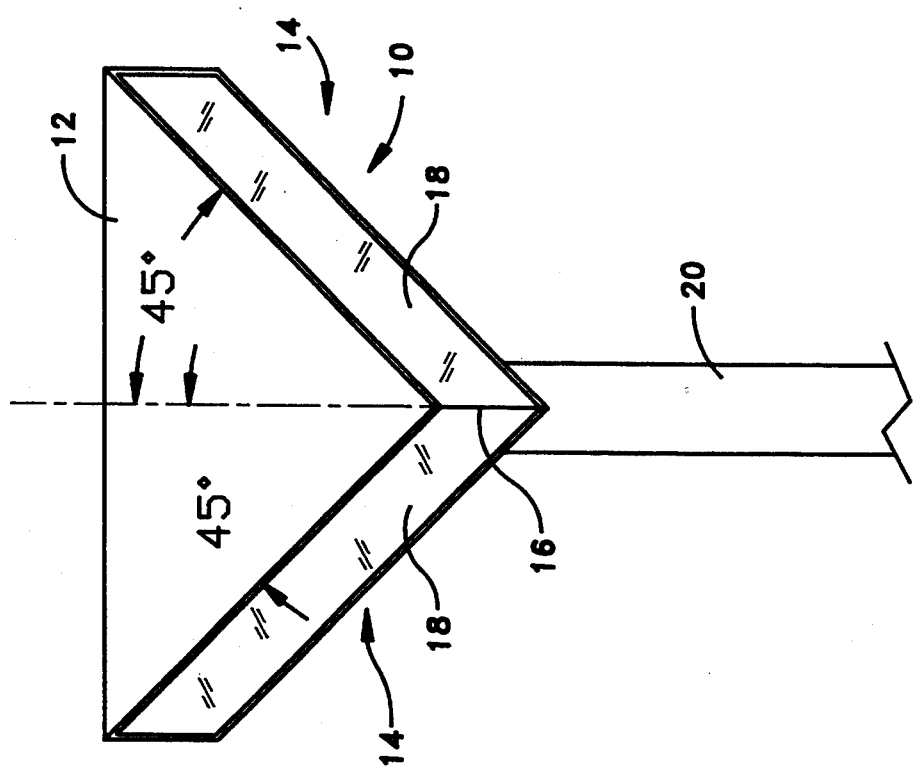
FIG. 1 is a perspective view of a first embodiment of a mirror constructed according to the present invention.

Referring initially to FIG. 1, a first embodiment of a mirror arrangement 10 constructed according to the present invention generally includes a polygonal three dimensional member 12, preferably having a triangular shape when viewed in plan, the polygonal three dimensional member 12 having at least two generally planar side faces 14 that are oriented obliquely with respect to one another, the two side faces 14 meeting one another at an apex 16. At least one mirrored (or reflective) surface 18 is provided on each of the two side faces 14. In the first embodiment shown in FIG. 1, the angle of the apex (i.e., the angle between the two mirrored surfaces 18 is substantially about 90 degrees.

The mirror arrangement 10 is preferably provided with a mounting shaft 20 which is connected to the polygonal three dimensional member 12 and which extends substantially vertically downward therefrom. The mounting shaft 20 is preferably employed for mounting the mirror arrangement 10 on either or both of the forward and/or rearward portions of a motor vehicle, as discussed more fully below.

Figure 3:
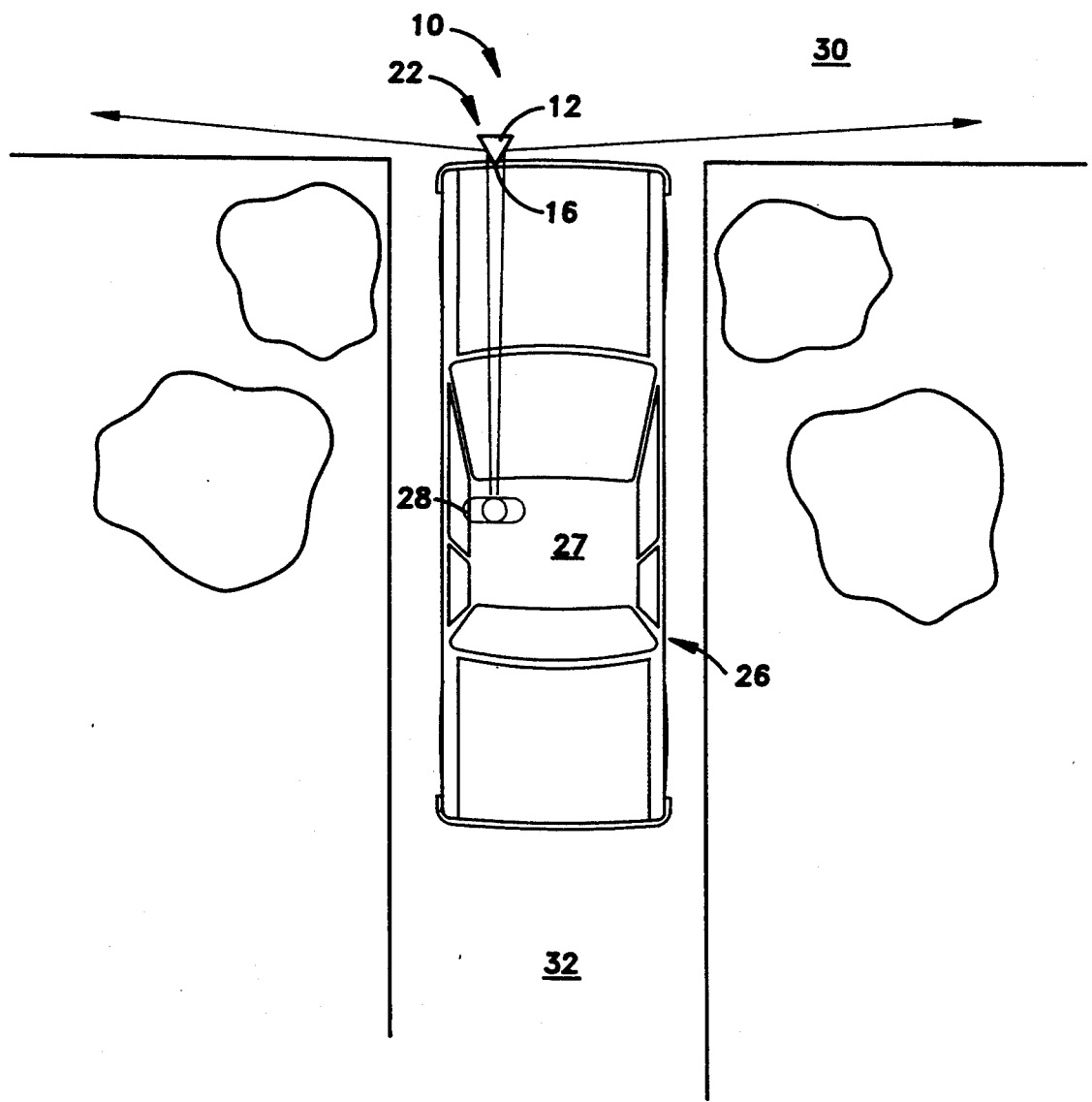
FIG. 3 is an illustration of a motor vehicle equipped with the inventive mirror arrangement positioned on the front of the motor vehicle entering a main street from a side street, and showing how the inventive mirror arrangement affords a motorist with an improved view of traffic oncoming on the main street.
Figure 4:
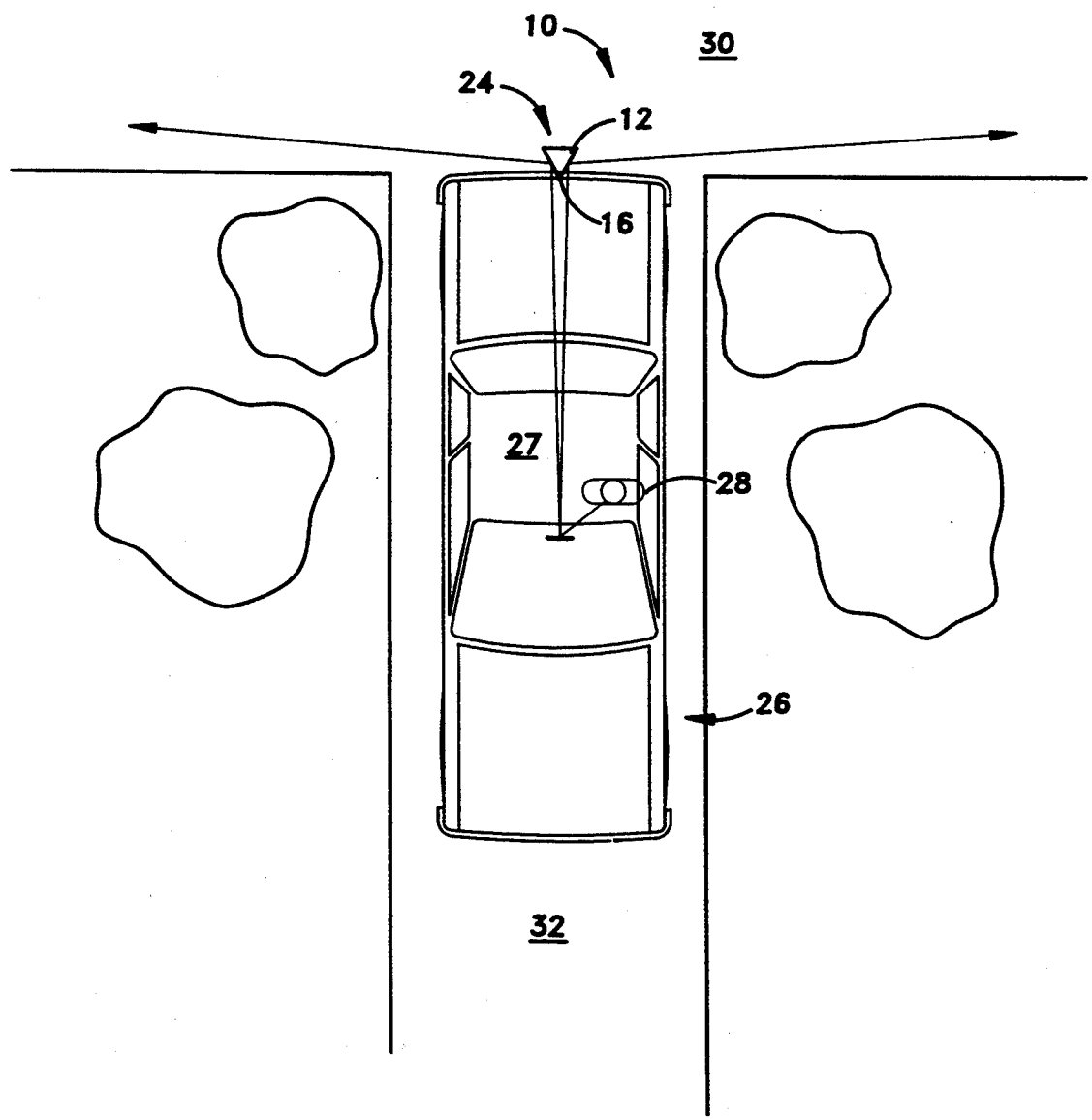
FIG. 4 is an illustration of a motor vehicle equipped with the inventive mirror arrangement positioned on the rear of the motor vehicle entering a main street from a side street, and showing how the inventive mirror arrangement affords a motorist with an improved view of traffic oncoming on the main street.

As seen in both of FIGS. 3 and 4, the mirror arrangement 10 may be mounted on either a forward portion (22 in FIG. 3) or a rearward portion (24 in FIG. 4) of a motor vehicle 26, such that the apex 16 points toward a passenger compartment 27 thereof. This presents an operator 28 of the motor vehicle 26 with views that are substantially perpendicular to the direction of travel of the motor vehicle 26. In FIG. 3, the motor vehicle 26 is shown entering a main street 30 in a forward direction (that is, with the motor vehicle 26 moving in a forward gear) from a side (or "blind") street 32. In such a situation, and with the mirror arrangement 10 mounted on the forward portion 22 of the motor vehicle 26, the operator 28 is able to determine, by directly viewing the two mirrored surfaces 18 through a windshield 34 of the motor vehicle 26, whether traffic is oncoming from either of the two directions on the main street 30 that are transverse to the operator's direction of travel FIG. 4 illustrates the motor vehicle 26 "backing out" onto the main street 30 from the side street 32. Here, with the mirror arrangement 10 mounted on the rearward portion 24 of the motor vehicle 26, the operator 28 is, once again, able to determine, by viewing the two mirrored surfaces 18 in a conventional rear view mirror 36 of the motor vehicle 26 and through a conventional rear window 38 of the motor vehicle 24, whether traffic is oncoming from either of the two directions on the main street 30 that are transverse to the operator's direction of travel.

Figure 2:
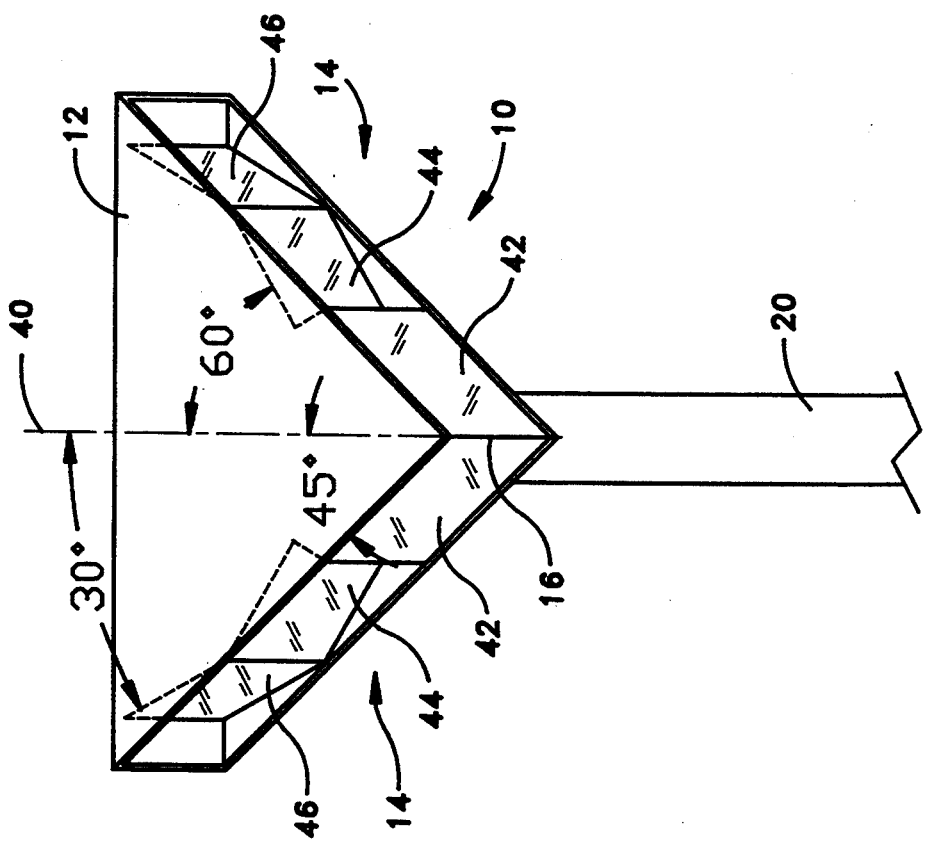
FIG. 2 is a perspective view of a second embodiment of a mirror constructed according to the invention.

An alternative embodiment of the mirror arrangement 10 is shown in FIG. 2. Here, each of the side faces 14 is provided with a number of distinctly oriented facet surfaces. In this regard, each of the facet surfaces provided on each of the side faces 14 has a unique and distinct angular inclination with respect to a line 40 that bisects the apex 16. The facet surfaces are preferably provided in pairs, with one each of the pairs of facet surfaces being disposed on one each of the side faces 14. Thus, in the embodiment shown in FIG. 2, the mirror arrangement 10 includes three such pairs of facet surfaces: a first pair of facet surfaces 42, each of which is oriented at substantially about a 45 degree angle with respect to the bisecting line 40; a second pair of facet surfaces 44, each of which is oriented at substantially about a 60 degree angle with respect to the bisecting line 40; and a third pair of facet surfaces 46, each of which is oriented at substantially about a 30 degree angle with respect to the bisecting line 40.

The embodiment of FIG. 2 furnishes the operator 28 with multiple views at different and distinct angles with respect to his or her direction of travel. It is particularly useful when the operator 28 wishes to ascertain conditions in directions which are not merely at more or less right angles to the direction of travel, but at different inclinations. This can be useful, for example, when entering a main street from a side street that is oriented diagonally with respect thereto. Another example of a situation where the FIG. 2 embodiment is useful is in performing a parking maneuver, where it is helpful to know what the conditions are at various angles of inclination. In this regard, the FIG. 2 embodiment has been found by the present inventor to be particularly useful in executing a so-called "diagonal" parking maneuver.

Figure 5:
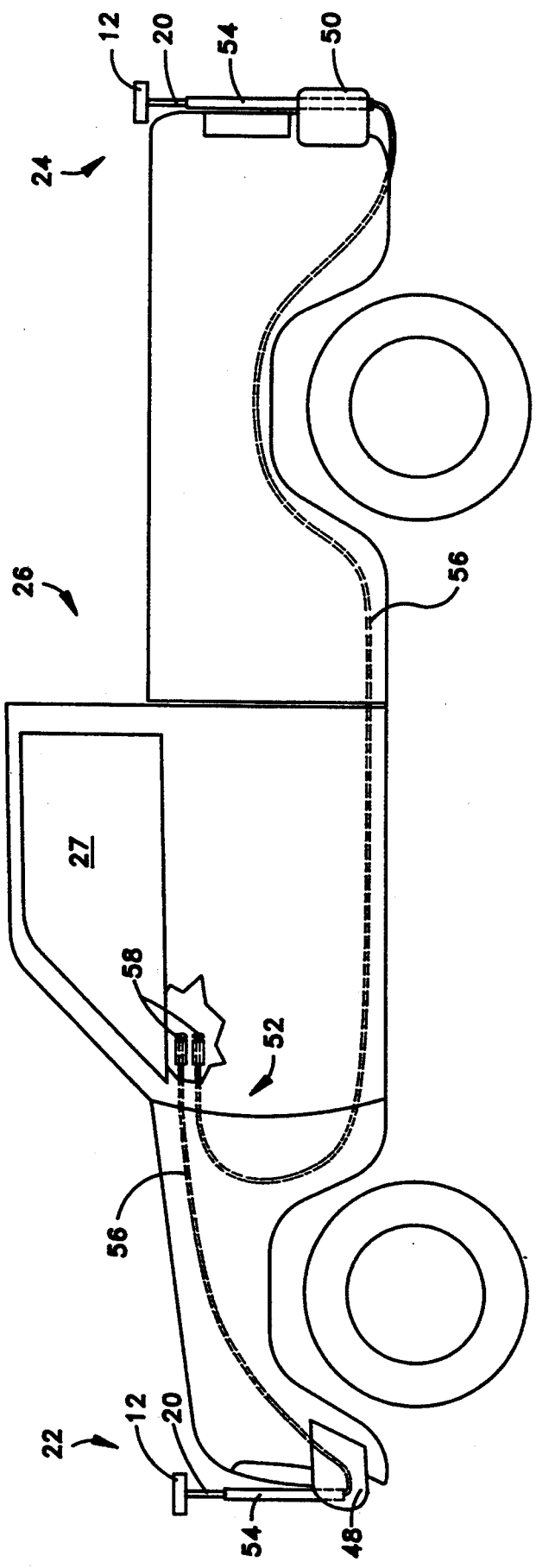
FIG. 5 is a side elevational view of a motor vehicle equipped with the inventive mirror arrangement on both a forward portion and a rearward portion thereof.
Figure 6:
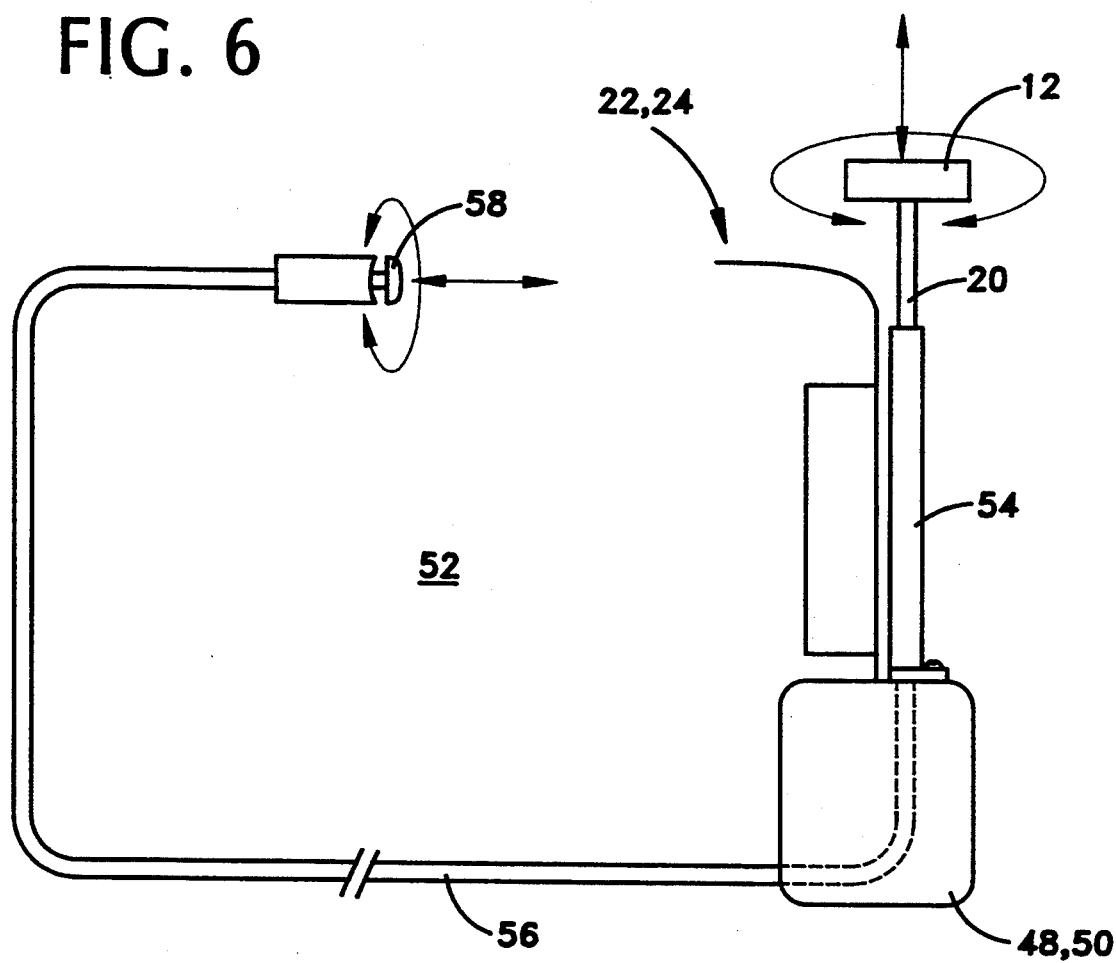
FIG. 6 is an illustration showing a control mechanism for allowing a motorist to adjust the angle of presented by the inventive mirror arrangement.

FIGS. 5 and 6 illustrate one possible manner of mounting the mirror arrangement 10 to either or both of the forward portion 22 and/or the rearward portion 24 of the motor vehicle 26. There, the polygonal three dimensional member 12 is shown mounted atop the mounting shaft 20 which projects upward from either or both of a front bumper 48 and/or a rear bumper 50 of the motor vehicle 26.

Additionally shown in FIGS. 5 and 6 is an optionally provided adjustment mechanism 52 which allows the operator 28 to control either or both of the angular orientation and/or the vertical height of the polygonal three dimensional member 12 with respect to the passenger compartment 27 of the motor vehicle 26. The adjustment mechanism 52 generally includes a mounting shaft housing 54 within which the mounting shaft 20 is positioned such that it is preferably both rotatable, extensible, and retractable with respect thereto, a preferably flexible coaxial cable 56, one terminal end of which is attached to the mounting shaft 20, the coaxial cable 56 snaking through the motor vehicle 26 to a point within the passenger compartment 27, and an adjustment knob 58 attached to the other terminal end of the coaxial cable 56 within the passenger compartment 27 and therefore easily accessible to the operator 28 (e.g., mounted on the dashboard). The adjustment mechanism 52 is particularly adapted for use in conjunction with the first embodiment of the mirror arrangement 10 shown in FIG. 1, in that it allows both the height and the angular orientation of the polygonal three dimensional member 12 to be changed at will by the operator, thereby affording various views. However, even though the FIG. 2 embodiment simultaneously presents the operator 28 with a number of views at different angles, the adjustment mechanism 52 may also be used in conjunction with this embodiment of the invention, in order to even further extend its versatility.

While the invention has been herein described by way of a particular preferred embodiment, various substitutions of equivalents may be effected without departing from the spirit and scope of the invention as set forth in the following claims.

What is claimed is:

1. A mirror arrangement for mounting on a motor vehicle, the motor vehicle having a passenger compartment, said mirror arrangement comprising:

a polygonal three dimensional member;

said polygonal three dimensional member having a pair of substantially converging side faces;

said substantially converging side faces of said polygonal three dimensional member converging at an apex;

said apex being oriented substantially toward the passenger compartment of the motor vehicle; and a plurality of facet surfaces formed in each of said substantially converging side faces;

each of said plurality of facet surfaces being substantially reflective;

said plurality of facet surfaces being provided in pairs, one each of said pairs of facet surfaces being disposed on one each of said substantially converging side faces; and each of said pairs of facet surfaces having a predetermined and distinct angular inclination with respect to a line bisecting said apex.

2. A mirror arrangement according to claim 1, wherein said mirror arrangement comprises three pairs of facet surfaces, each of a first pair of said three pairs of facet surfaces having a substantially 30 degree angular inclination with respect to said line bisecting said apex, each of a second pair of said three pairs of facet surfaces having a substantially 45 degree angular inclination with respect to said line bisecting said apex, and each of a third pair of said three pairs of facet surfaces having a substantially 60 degree angular inclination with respect to said line bisecting said apex.

* * * * *